United States Patent [19]

Yoshimura et al.

[11] Patent Number: 4,901,119
[45] Date of Patent: Feb. 13, 1990

[54] VIDEO SIGNAL RECORDING AND/OR REPRODUCING APPARATUS

[75] Inventors: Katsuji Yoshimura; Toshiyuki Masui; Chikara Sato; Tadayoshi Nakayama, all of Kanagawa, Japan

[73] Assignee: Canon Kabushiki Kaisha, Tokyo, Japan

[21] Appl. No.: 273,735

[22] Filed: Nov. 15, 1988

Related U.S. Application Data

[63] Continuation of Ser. No. 78,219, Jul. 27, 1987, abandoned.

[30] Foreign Application Priority Data

Jul. 28, 1986 [JP] Japan ................................. 61-175753

[51] Int. Cl.[4] .......................... H04N 9/80; H04N 9/89
[52] U.S. Cl. ...................................... 358/319; 360/9.1; 360/35.1
[58] Field of Search .................... 358/324, 337-339; 360/9.1, 35.1, 36, 10.1

[56] References Cited

U.S. PATENT DOCUMENTS 4,110,799  8/1978  Bergmans et al. ............... 360/70
4,131,919 12/1978  Lloyd et al. ....................... 360/35.1
4,378,593  3/1983  Yamamoto ......................... 364/900
4,789,960 12/1988  Willis ............................. 365/189 X Primary Examiner—L. T. Hix
Assistant Examiner—D. Rutledge
Attorney, Agent, or Firm—Robin, Blecker, Daley & Driscoll

[57] ABSTRACT

A video signal recording and/or reproduction apparatus in which an analog video signal from the inlet is digitized to form video data, then the video data are stored in a memory means for a time, then the stored video data are read out from the memory means before they are recorded on a recording medium. When reproducing the recorded video data from the recording medium, the reproduced video data are stored in a memory means for a time, then the stored video data are read out from the memory means, then the analog video signal is restored from the read video data, and then the analog video signal is produced at the output of the apparatus. Further, by taking the synchronism of the write and read control signals of different frequency for either of the memory means of the recording and reproducing systems, it is made possible to assure accurate and reliable conversion between the analog and digital forms of the video signals when either in the record or in the reproduction mode.

13 Claims, 2 Drawing Sheets

VIDEO SIGNAL RECORDING AND/OR REPRODUCING APPARATUS

This application is a continuation, of application Ser. No. 078,219, filed 7/27/87 now abandoned.

BACKGROUND OF THE INVENTION

1. Field of the Invention

This invention relates to a video signal recording and/or reproduction apparatus in which video signals are digitized, then stored in a memory, and then recorded, and the digitized video signals are reproduced through another memory for storage of the video data.

2. Description of the Related Art

In the field of art of recording and/or reproduction apparatus, for example, video tape recorders, there has been proposed a technique of digitizing the video signals by PCM (pulse code modulation) before they are recorded on the recording medium and retrieving them from the digital form when in reproduction. For the purpose of sampling the video signals (the number of quantized bits: 8), the frequency is taken usually at a value equal to 4 fsc's (frequency of color subcarrier). And, either when recording or when reproducing, the digitized video signals, or the video data, are written in a field emory such as dynamic RAM in synchronism with a clock, and then read out therefrom in synchronism with another clock. An example of combination of the frequencies of the write- and read-clocks is shown in Table 1 below.

TABLE 1

|  | Write-Clock | Read-Clock |
|---|---|---|
| When recording | 4 fsc's | 63 KHz |
| When reproducing | 63 KHz | 4 fsc's |

In Table 1, the value of 63 KHz is obtained by dividing the frequency of the master clock which has a value of 11.58 MHz and is used to form the PCM signal for the audible range. Also, the value of 4 fsc's is obtained from the master clock of the VTR (video tape recorder) or the synchronizing signal separated out of the television signal inputted when in recording.

In the conventional video signal recording and/or reproduction apparatus, however, for the aforesaid video data to be written in the aforesaid field memory or to be read out therefrom, no synchronism is taken between the write-clock and the read-clock. In the case that the frequencies of the write- and read-clocks differ from each other as has been described above, therefore, there is a possibility of occurrence of an appreciable phase discrepancy. This led to a problem that the writing and reading operations for the field memory overlap each other. In more detail, on assumption that, as shown in FIG. 1, the writing of the video data is performed when the write-clock rises, and the reading of the video data is performed when the read-clock falls, because these clocks are not in synchronism, it will then eventually occur that the writing time and the reading time overlap each other. This gives rise to problems such as that of failing in normally performing the writing or the reading.

SUMMARY OF THE INVENTION

An object of the present invention is to eliminate the above-described problems.

Another object is to provide a video signal recording apparatus having means for memorizing video data in which the timings of writing and reading the video data in and from the aforesaid memorizing means do not overlap each other, thereby it being made possible to assure a normal recording of the digitized video signals.

Under such an object, according to the present invention, in an embodiment thereof as applied to the video signal recording apparatus in which an analog video signal is digitized before it is recorded on a recording medium, provision is made of:

converting means receptive of the analog video signal for digitizing the aforesaid inputted analog video signal to produce it as video data at the output thereof;

memory means for temporarily storing the video data obtained by the converting means;

clock signal forming means for producing a first clock signal for writing the video data obtained from the converting means in the memory means, and a second clock signal of different frequency from that of the first clock signal for reading the video data stored in the memory means from the memory means, and for making synchronous the phases of the first and second clock signals to each other; and recording means for recording the video data read out from the memory means on a recording medium.

Another object of the invention is to provide a video signal reproducing apparatus having means for memorizing video data in which the timings of writing and reading of the video data in and from the memory means are prevented from overlapping. Thus, it is made possible to assure that the digitized video signal is normally reproduced.

Under such an object, according to the invention, in an embodiment thereof as applied to the reproducing apparatus in which the video data recorded in a recording medium is reproduced from the recording medium, then converted to an analog video signal and then produced at the output thereof, provision is made of:

reproducing means for reproducing the video data recorded in the recording medium from the recording medium and producing it at the output thereof;

memory means for temporarily storing the video data obtained from the reproducing means;

clock signal forming means for forming a first clock signal for writing the video data obtained by the reproducing mean in the memory means and a second clock signal of different frequency from that of the first clock signal for reading out the video data stored in the memory means from the memory means, and for making synchronous the phases of the first and second clock signals to each other; and restoring means for restoring the analog video signal from the video data read out from the memory means and producing it at the output thereof.

Still another object of the invention is to provide a video signal recording and reproduction apparatus having means for memorizing video data in which the timings of writing and reading of the video data in and from the memory means are prevented from overlapping each other. Thus, it is made possible to assure either of a normal recording and a normal reproduction of the digitized video signal.

Under such an object, according to the present invention, in an embodiment thereof as applied to the video signal recording and reproduction apparatus in which an analog video signal is digitized before it is recorded on a recording medium, and the digitized video signal recorded on the recording medium is reproduced from the aforesaid recording medium, and then converted to the analog video signal before it is produced at the output, provision is made of:

converting means receptive of the analog video signal for digitizing the aforesaid inputted analog video signal and producing it as video data at the output thereof;

first memory means for temporarily storing the video data obtained from the converting means;

reproducing means for reproducing the video data recorded on the recording medium from the recording medium and producing it at the output thereof;

second memory means for temporarily storing the video data obtained from the reproducing means;

control signal forming means for producing a write control signal for writing the video data in either the first or the second memory means, and a read control signal of different frequency from that of the write control signal for reading out the recorded video data from either the first or the second memory means, for supplying the write and read control signals to the first memory means when the video signal is recorded, or to the second memory means when the video signal is reproduced, and for making synchronous the phases of the write and read control signals;

recording means for recording the video data read out from the second memory means on the recording medium; and restoring means for the analog video signal from the video data read out from the second memory means.

Other objects and features of the invention than those described above will become apparent from the following detailed description of an embodiment thereof by reference to the accompanying drawings.

DETAILED DESCRIPTION OF THE PREFERRED EMBODIMENTS

Figure 1:
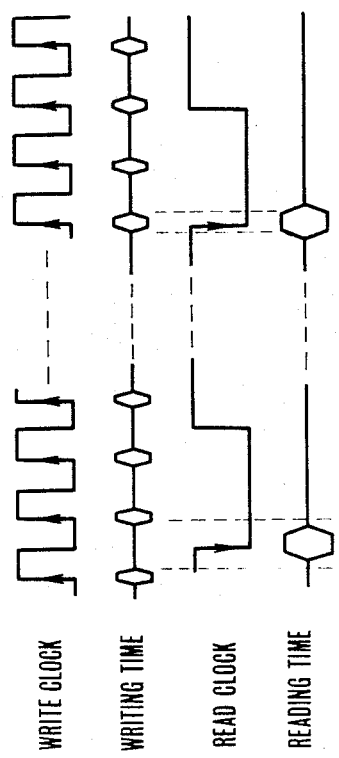
FIG. 1 is a timing chart of the write- and read-signals for the conventional field memory.
Figure 2:
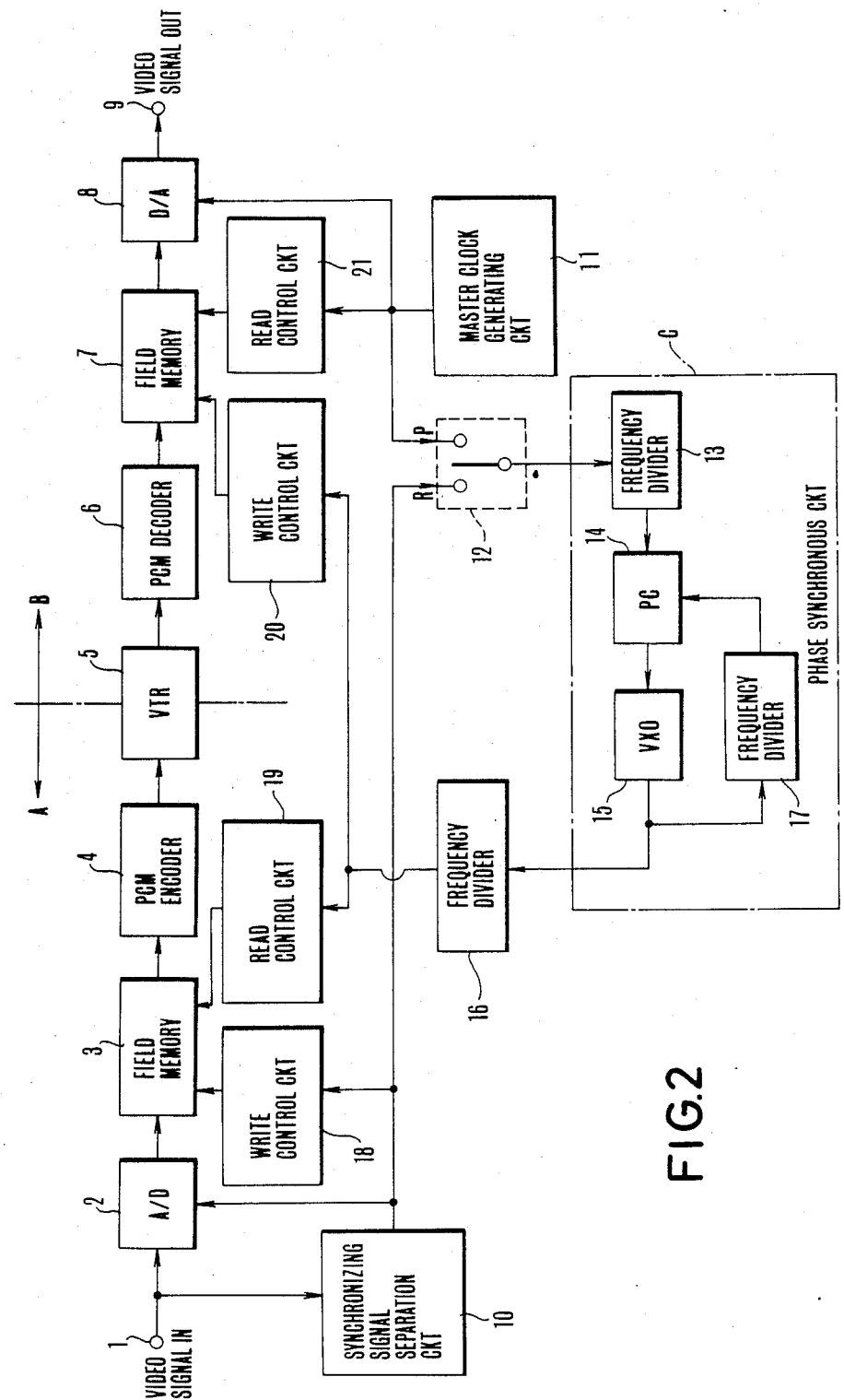
FIG. 2 is a block diagram illustrating the structure of a circuit of an embodiment of the video signal recording and/or reproduction apparatus according to the invention.

The present invention is next described in connection with an embodiment thereof. FIG. 2 in block diagram illustrates the video signal recording and/or reproduction apparatus comprising a recording circuit system A, a reproducing circuit system B and a phase synchronous circuit C.

When in record mode, a video signal entering at an input terminal 1 first goes to an A/D (analog/digital) converter 2 where it is digitized by sampling with a frequency of 4 fsc's to 8 quantized bits, and becomes video data. These video data are written in a field memory 3 in sequence by a write-clock whose frequency is 4 fsc's, and then read out in sequence by a read-clock signal whose frequency is 63 KHz, entering a PCM encoder 4. And, in the PCM encoder 4, treatments such as an error correction code addition and digital modulation for recording are carried out. After that, they are recorded on a magnetic tape (not shown) of a recording or reproducing portion 5. When in reproduction mode, the data reproduced from the aforesaid magnetic tape of the recording or reproducing portion 5 first enter a PCM decoder 6 where treatments such as error detection and correction and digital demodulation are carried out. After that, they are written in a field memory 7 in sequence by a write-clock whose frequency is 63 KHz, then read out in sequence by a read-clock whose frequency is 4 fsc's, and then applied to a D/A (digital/analog) converter 8. And, in this D/A converter 8, they are converted to the original analog video signal, which then appears at an output terminal 9.

Next described is the operation of the phase synchronous circuit C. The aforesaid clock of 4 fsc's in frequency for the recording purpose is formed in such a way that the synchronizing signal contained in the video signal is separated out by a synchronizing signal separator circuit 10, then a frequency component of fsc is further separated out of the separated synchronizing signal, and then it is multiplied by 4. For the reproducing purpose, it is obtained from a master clock generating circuit 11 of the reproducing circuit system B. These clocks are selectively applied to the phase synchronous circuit C by a switch 12, which is connected to R side in FIG. 2 at the time of recording and connected to P side in FIG. 2 at the time of reproducing, depending on which mode is in operation. The clock of 4 fsc's inputted in the phase synchronous circuit C is first applied to a frequency divider 13 by which its frequency is divided by 238,875. The output of the frequency divider 13 is then applied to a phase comparator 14, of which the output signal is then applied to a voltage control type crystal oscillator 15 (frequency 11.58 MHz), where the phase is controlled. The thus-phase-controlled clock goes from the circuit C to a frequency divider 16, by which its frequency is divided by 184 to obtain the clock of 63 KHz for the aforesaid field memories 3 and 7. The output of the oscillator 15 after having passed through a second frequency divider 17 of 1/193,000 is fed back to the phase comparator 14. Hence, a PLL circuit is formed to always perform phase control. In the drawing, 18 and 19 are respectively write and read control circuits for the first field memory 3. 20 and 21 are respectively write and read control circuits for the second field memory 7.

In such a manner, the use of the phase synchronous circuit C provides a possibility of bringing the clock having a frequency of 4 fsc's which has been made up from the aforesaid synchronizing signal and the clock having the same frequency of 4 fsc's but obtained from the master clock of the reproducing circuit system B into coincidence in phase with the clock having a frequency of 63 KHz which is the master clock for use in obtaining the audio or PCM signal. In addition to this, since, in the aforesaid write and read control circuits 18 and 19, the write and read clocks for the field memory formed from the clock of the frequency 4 fsc and the clock of the frequency 63 KHz are maintained in a certain phase relationship, an overlapping of the timings of the writing and reading of the field memory 3 or 7 which would otherwise result from the accidental phase shifting never occurs. Hence it is also made possible to assure a reliable recording or reproducing of video data.

It is to be noted that instead of using the two field memories 3 and 7 in the recording and reproducing circuits, it is possible to make a single one sufficient for use in common. For this case, one of the two sets of write and read control circuits 18 and 20, and 19 and 21 can be omitted.

As has been described above, according to the present invention, the recording or reproduction apparatus is provided with a phase synchronous circuit for bringing the phases of the write and read clocks of different frequency into coincidence with each other, thereby giving an advantage that the periods of writing and reading the video data in and from the memory can be prevented from overlapping each other. Thus, the digitized video signal can be recorded or reproduced without suffering faulty operation.

What is claimed is:

1. A video signal recording apparatus in which an analog video signal is digitized before being recorded on a recording medium, comprising:
   (A) converting means receptive of and digitizing the analog video signal and producing the digitized inputted analog video signal as video data;
   (B) memory means for temporarily memorizing the video data produced by said converting means;
   (C) clock signal forming means for producing a first clock signal for writing the video data produced by said converting means in said memory means and a second clock signal of different frequency from that of said first clock for reading the memorized video data in said memory means from said memory means, and for synchronizing the phases of said first and said second clock signals with each other; and
   (D) recording means for recording the video data read out from said memory means on said recording medium.

2. An apparatus according to claim 1, wherein said converting means includes an analog-to-digital conversion circuit.

3. An apparatus according to claim 2, wherein said memory means includes a memory circuit.

4. An apparatus according to claim 1, wherein said clock signal forming means includes:
   (a) a first clock signal forming circuit for separating from the inputted analog video signal a synchronizing signal of said analog video signal, and forming a first clock signal synchronized with the separated synchronizing signal;
   (b) a second clock signal generating circuit for producing a second clock signal; and
   (c) a phase comparing circuit for comparing the phases of the first clock signal produced from said first clock signal forming circuit and the second clock signal produced from said second clock signal generating circuit with each other so that, depending on that comparison result, the phase of the second clock signal to be produced from said second clock signal generating circuit is controlled.

5. An apparatus according to claim 1, wherein said recording means includes:
   (a) a data processing circuit for adding to the video data read out from said memory means a data for error correction, and converting the data read out for error correction data, and converting the data read out combined with said error correction data to output data suited for recording; and
   (b) a recording mechanism for recording said output data of said data processing circuit.

6. A reproducing apparatus for reproducing video data recorded on a recording medium from said recording medium, converting said reproduced data to an analog video signal and producing a converted analog video signal, comprising:
   (A) reproducing means for reproducing the video data recorded in said recording medium from said recording medium and producing the reproduced video data;
   (B) memory means for temporarily memorizing the reproduced video data obtained from said reproducing means;
   (C) clock signal forming means for producing a first clock signal for writing the reproduced video data obtained from said reproducing means in said memory means and a second clock signal of different frequency from that of said first clock signal for reading the reproduced video data memorized in said memory means from said memory means, and for synchronizing the phases of said first and said second clock signals with each other; and
   (D) restoring means for restoring the analog video signal from the reproduced video data read out from said memory means.

7. An apparatus according to claim 6, wherein said reproducing means includes:
   (a) a reproducing mechanism for reproducing the video data recorded on said recording medium; and
   (b) a data processing circuit receptive of the video data reproduced from said reproducing mechanism for applying error correction data to the reproduced video data for error correction.

8. An apparatus according to claim 6, wherein said memory means includes a memory circuit.

9. An apparatus according to claim 6, wherein said clock signal forming means includes:
   (a) a first clock signal generating circuit for producing a first clock signal;
   (b) a second clock signal generating circuit for producing a second clock signal; and
   (c) a phase comparison circuit for comparing the phases of the first clock signal produced from said first clock signal generating circuit and the second clock signal produced from said second clock signal generating circuit with each other so that, depending on that comparison result, the phase of the first clock signal to be produced from said first clock signal generating circuit is controlled.

10. An apparatus according to claim 6, wherein said restoring means includes a digital-to-analog conversion circuit.

11. A video signal recording and reproducing apparatus in which an analog video signal is digitized before being recorded on a recording medium, and the digitized video signal on said recording medium is reproduced from said recording medium and is converted to an analog signal, comprising:
   (A) converting means receptive of and digitizing the analog video signal and producing the digitized inputted analog video signal as video data;
   (B) first memory means for temporarily memorizing the video data produced by said converting means;
   (C) reproducing means for reproducing the video data recorded on said recording medium from said recording medium and providing the reproduced video data;
   (D) second memory means for temporarily memorizing the reproduced video data provided by said reproducing means;
   (E) control system forming means for producing a write control signal for writing the video data in said first or said second memory means and a read control signal of different frequency from that of said write control signal for reading the memorized video data from said first or said second memory means, supplying said write and said read control signals to said first memory means when said video signal is recorded and to said second memory means when said video signal is reproduced, and synchronizing the phases of said write and said read control signals with each other;

(F) recording means for reproducing the reproduced video data read out from said first memory means on said recording medium; and (G) restoring means for restoring an analog video signal from the video data read out from said second memory means.

12. An apparatus according to claim 11, wherein said control signal forming means includes:

(a) a first clock signal forming circuit for separating from the inputted analog video signal a synchronizing signal of said analog video signal and producing a first clock signal as the write control signal for said first memory means synchronized with the separated synchronizing signal;

(b) a second clock signal generating circuit for producing a second clock signal as the read control signal for said second memory means;

(c) a third clock signal generating circuit for producing a third clock signal as the read control signal for said first memory means and as the write control signal for said second memory means; and (d) a phase comparison circuit responsive to recording of said video signal for comparing the phases of the first clock signal produced from said first clock signal forming circuit and the third clock signal produced from said third clock signal generating circuit with each other, and responsive to reproducing said video signal for comparing the phases of the second clock signal produced from said second clock signal generating circuit and the third clock signal produced from said third clock signal generating circuit with each other, so that, depending on either of those comparison results, the phase of the third clock signal to be produced from said third clock signal generating circuit is controlled.

13. A data signal processing apparatus for either memorizing a data signal in a memory circuit or reading the memorized data signal from said memory circuit, comprising:

(A) a memory circuit for once memorizing said data signal;

(B) a clock signal forming circuit for producing a first clock signal and a second clock signal of different frequency from that of said first clock signal, and synchronizing the phases of said first and said second clock signals with each other;

(C) a write control circuit for controlling the writing of the data signal in said memory circuit in accordance with the first clock signal produced from said clock signal forming circuit; and (D) a read control circuit for controlling the reading of the data signal in said memory circuit in accordance with the second clock signal produced from said clock signal forming circuit.

* * * * *